(12) United States Patent
Nissen et al.

(10) Patent No.: US 6,341,057 B1
(45) Date of Patent: Jan. 22, 2002

(54) DOUBLE LAYER CAPACITOR AND ITS MANUFACTURING METHOD

(75) Inventors: Ole Stig Nissen, Odense C; Hans Christian Beck, Odense M; Michael Schou, Odense C, all of (DK)

(73) Assignee: Danionics A/S, Odense (DK)

( * ) Notice: Subject to any disclaimer, the term of this patent is extended or adjusted under 35 U.S.C. 154(b) by 0 days.

(21) Appl. No.: 09/530,870

(22) PCT Filed: Nov. 4, 1998

(86) PCT No.: PCT/EP98/07206

§ 371 Date: Jun. 30, 2000

§ 102(e) Date: Jun. 30, 2000

(87) PCT Pub. No.: WO99/24995

PCT Pub. Date: May 20, 1999

(30) Foreign Application Priority Data

Nov. 5, 1997 (DK) ............................................ 1257/97

(51) Int. Cl.$^7$ ................................................. H01G 9/00
(52) U.S. Cl. ........................ 361/502; 361/503; 361/505; 361/508; 361/518; 428/209
(58) Field of Search ................................. 361/502, 517, 361/418, 523, 525, 503–506, 524; 428/209

(56) References Cited

U.S. PATENT DOCUMENTS

| | | | |
|---|---|---|---|
| 5,077,634 A | 12/1991 | Shirata et al. | 361/502 |
| 5,099,398 A | 3/1992 | Kurabayashi et al. | 25/25.41 |
| 5,115,378 A | 5/1992 | Tsuchiya et al. | 361/502 |
| 5,150,283 A | 9/1992 | Yoshida et al. | |
| 5,219,673 A | 6/1993 | Kaun | 429/13 |
| 5,304,330 A | 4/1994 | Tatarchuk et al. | |
| 5,450,279 A * | 9/1995 | Yoshida et al. | 361/502 |
| 5,557,497 A | 9/1996 | Ivanov et al. | 361/502 |
| 5,670,266 A | 9/1997 | Thomas et al. | 361/502 |
| 5,682,288 A | 10/1997 | Wani | 29/25.03 |
| 5,705,259 A * | 1/1998 | Mrotek et al. | 428/209 |
| 5,834,147 A * | 11/1998 | Nagae et al. | 430/67 |
| 5,867,363 A * | 2/1999 | Tsai et al. | 361/502 |
| 5,907,472 A * | 5/1999 | Farahmandi et al. | 361/502 |
| 5,909,356 A * | 6/1999 | Hirabayashi et al. | 361/523 |
| 6,031,712 A * | 2/2000 | Kurihara et al. | 361/502 |
| 6,064,562 A * | 5/2000 | Okamura | 361/502 |
| 6,094,338 A * | 7/2000 | Hirahara et al. | 361/502 |
| 6,181,546 B1 * | 1/2001 | Stepanov et al. | 361/502 |
| 6,201,658 B1 * | 3/2001 | Jerabek et al. | 361/502 |

FOREIGN PATENT DOCUMENTS

| | | |
|---|---|---|
| EP | 0660345 A1 | 6/1995 |
| EP | 0763836 A2 | 3/1997 |
| EP | 0791973 A2 | 8/1997 |
| JP | 60050914 | 3/1985 |
| JP | 61102025 | 5/1986 |

OTHER PUBLICATIONS

Patent Abstracts of Japan, publication No. 06084700, publication date Mar. 25 1994.
Patent Abstracts of Japan, publication No. 05234830, publication date Sep. 10 1993.

* cited by examiner

*Primary Examiner*—Dean A. Reichard
*Assistant Examiner*—Nguyen T Ha
(74) *Attorney, Agent, or Firm*—Darby & Darby

(57) ABSTRACT

A double layer capacitor and a method for producing the same wherein the double layer capacitor comprises a conductive coating based on binders of the melamine resin type such that the conductive coating is present at the interfaces between the current collectors and the electrodes. The double layer capacitor thus produced has good mechanical and chemical integrity and flexibility and is suitable for use in combination with batteries.

63 Claims, No Drawings

DOUBLE LAYER CAPACITOR AND ITS MANUFACTURING METHOD

FIELD OF THE INVENTION

The present invention relates to a double layer capacitor, a method for the preparation thereof and the use thereof in a combined application with batteries.

BACKGROUND OF THE INVENTION

The development of capacitor technology based on the principle of energy storage in the electrochemical double layer formed at the interface between an ion-conducting phase, i.e. the electrolyte, and an electron-conducting phase, i.e, the electrode, has provided capacitors of extremely high capacitance. Such capacitors are usually referred to as double layer capacitors, supercapacitors, electrochemical capacitor or ultracapacitors.

The energy storage in such capacitors may involve electrochemical processes like in batteries, i.e. energy is stored chemically in the capacitor electrodes and the electrode reactions involve redox processes. One such system is the rubidium silver iodide low voltage electrochemical Hypercap capacitor from Technautics. Alternatively, the capacitor may be based entirely on the double layer energy storage principle. Such capacitors will below be referred to as double layer capacitors.

One important application of double layer capacitors is in hybrid combinations with batteries. Traditionally, double layer capacitors provide high power capabilities compared to batteries, e.g. during pulse applications a higher power is obtainable from the double layer capacitor than from the battery. Accordingly, the power capability of hybrid combinations is higher than for the battery alone, and further the stress on the battery is reduced due to more uniform load. A number of patents describes the use of such battery-capacitor hybrid systems, among those U.S. Pat. No. 5,587,250 and U.S. Pat. No. 5,670,266 to Motorola.

High capacitance and low impedance are the two main technical features providing the high power capabilities of double layer capacitors. The capacitance provides the energy for the load, whereas the low impedance allows good power accessibility in that the energy is available without too high internal losses.

In particular, as most pulsed loadings operate in the Hz-range from 1Hz to 1kHz, the capacitor impedance in this should be low, i.e. the main part of the energy stored in the capacitor should be available in this frequency range. A number of patents and patent applications describe approaches to double layer capacitors of low internal resistance.

European patent application EP 763,836 to Nisshinbo Industries discloses a polarisable electrode for use in a electric double layer capacitor, having a low internal resistance and a high capacitance, the carbon mixture of the electrode characterised by comprising fibrillated carbon. A conductive agent may be added to the carbon mixture to improve electrical conductivity. Such electrode has long life and can be charged and discharged at large electric currents.

European patent application EP 660,345 to Nisshinbo Industries discloses a polarisable electrode comprising a solid active carbon, characterised in that the electrode on the surface and/or inside has discontinuous portions free from said solid active carbon. A conductive agent such as graphite or carbon black may be added to the carbon mixture to improve electrical conductivity.

U.S. Pat. No. 5,682,288 to Japan Gore-Tex, Inc. discloses a planar layered electrode comprising acicular electrically conductive particles to provide low electrical resistance and which has high electric storage capacity.

U.S. Pat. No. 5,077,634 to Isuzu describes electrodes for double layer capacitors, which are compressed for reduction of internal resistance.

Low impedance double layer capacitors should display low intra-component impedance as well as low inter-component impedance. Whereas the above prior art has been focussed on low intra-component impedance in the electrode structures, the impedance of the interface to the current collectors is just as important. Electrodes of high resistance at the current collector-electrode interphase, e.g. due to poor adhesion and poor electrical contact, will suffer from poor power capability due to internal losses.

A number of patents describes double layer capacitors of elaborated electrode-current collector interface.

JP-06,084,700 to Matsushita discloses a conductor layer made of carbonaceous material such as graphite provided between the electrode and the collector, the binder being an acrylic acid-styrene copolymer and providing increased adhesion for the electrodes. JP-61,102,025 to Matsushita discloses an electric double layer capacitor of polarising electrodes from activated carbon fiber felt, the electrode having a conductive layer on one side. The conductive layer may be aluminium, titanium, nickel or tantalum, stainless steel or a conductive paint containing carbon particles. The electrolyte of said capacitor is a solution of $(NEt_4)$ $ClO_4$ in propylene carbonate. Upon repeated charging and discharging, the capacitor has stable capacitance.

JP-60,050,914 to NEC discloses a double layer capacitor having a reduced internal resistance, the capacitor having electrodes covered by conductive layers consisting of a polymer such as polypropylene and a conductor such as carbon black or carbon fibers.

U.S. Pat. No. 5,150,283 to Matsushita describes electrodes for a double layer capacitor composed of electrically conductive substrates, coated with a mixture of activated carbon with a water-soluble material-based binding agent. Such capacitor has low internal resistance, withstanding high voltages.

U.S. Pat. No. 5,115,378 to Isuzu describes an electrode for a double layer capacitor formed from a porous sintered body of joined active carbon particles, conductivity being provided during sintering. Such capacitor has reduced internal resistance as low contact resistance between electrode body and current collector is obtained.

U.S. Pat. No. 5,099,398 to Isuzu describes an electrode for a double layer capacitor applied on an electrically conductive film, the surface of which is dissolved in a solvent and the dissolved portions of said current collector being present in the pores of the electrode bodies. Such capacitor has low internal resistance due to intimate contact at the molecular level.

Accordingly, several approaches to low internal resistance capacitors exist, including introducting of conductive coatings at the interface between the electrode and the current collector. Still, however, the is a need for a conductive coating which is stable under the severe conductions existing at this interface. This conductive coating should provide good adhesion to the current collector and to the electrode, and it should maintain its mechanical integrity upon handling such as folding and winding. Further, the coating should be stable at highly oxidative potentials at the positive electrode, and at highly reductive potentials at the negative electrode as well as being stable against corrosive electrolytes.

OBJECT OF THE INVENTION

Therefore, it is the objective of the present invention to provide a double layer capacitor with a conductive coating, which is mechanically, chemically, and eletrochemically stable during manufacture and operation. Such coating comprises a conductive agent, a binder and optionally auxiliary materials. Auxiliary materials may be materials used entirely during the processing of the conductive coating and which are removed from the final coating, or they be materials which facilitate the processing and which remain in the final coating.

BRIEF DESCRIPTION OF THE INVENTION

From a comprehensive study of a high number of conductive coatings it has now been found, that those coatings based on binders of the melamine resin type fulfil the above objectives.

Surprisingly it was found, that the melamine resin binders provide long term reduction stability at potentials as low as +1.0V vs. Li/Li$^+$. Whereas the considerable stability of melamine resins against oxidation is well known from their long term stability under ambient conditions, their high stability against reduction is surprising considering their chemical composition. Traditionally only fluorinated compound display stability under such reductive conditions.

From the study it was also found, that despite the fact that melamine resins are hard and often brittle, the coating based on melamine resin binders showed good mechanical integrity and flexibility during processing of double layer capacitors.

Thus, according to the present invention a double layer capacitor is provided, which comprises a conductive coating comprising a melamine resin binder at the interfaces between current collectors and electrodes. In particular, the present invention provides a double layer capacitor comprising metal foil current collectors, carbon electrode structures with a polymer binder, conductive coatings comprising a melamine resin binder at the interfaces between current collectors and electrodes, and a non-aqueous electrolyte. Such double layer capacitors display long term low impedance at the electrode-current collector interface and high power capabilities.

DETAILED DESCRIPTION OF THE INVENTION

In a preferred embodiment of the invention, the melamine resin is a alkylated melamine formaldehyde resin, preferably a methylated melamine formaldehyde resin. As reaction partner for the polymerisation process alkyd resins are preferred.

Further, the excellent performance has been found to be mostly pronounced for those double layer capacitors, which have conductive coatings of a thickness of 1–10 $\mu$m.

The conductive coating comprising a melamine resin binder preferably has a composition prior to coating of:

5–50% by weight, preferably 10–40% by weight, more preferably 20–35% by weight of carbon blacks;

5–20% by weight, preferably 5–15% by weight, more preferably 10–15% by weight of graphite;

5–40%, by weight, preferably 10–30% by weight, more preferably 15–25% by weight of melamine resin binder and polymerisation reaction partner;

25–85% by weight, preferably 30–74% by weight, more preferably 35–53% by weight of solvent; and 0–10% by weight, preferably 1–5% by weight, more preferably 2–5% by weight of auxiliary materials, preferably selected from the group consisting of dispersing agents, defoaming agents and rheological control agents.

The carbon blacks should display high structure and are advantageously selected from the group consisting of furnace blacks, acetylene blacks and lampblacks. The graphites should display low particle size, advantageously in the range of 0.5–20 $\mu$m, preferably 0.5–10 $\mu$m.

The solvents are preferably alcohols $R^1$—OH, wherein $R^1$ represents $C_1$–$C_4$ alkyl, and glycols and glycol ethers $R^2$—$(OCHR^3CH_2)_n$—OH, n=1–3, wherein $R^2$ represents hydrogen or $C_1$–$C_4$ alkyl and wherein $R^3$ represents hydrogen or methyl.

The dispersing agent may be non-ionic, anionic, cationic, as well as amphoteric. Preferably an anionic dispersing agent, such as Disperbyk 170 from BYK Chemie is used.

The defoaming agent may be a mineral oil or silicone oil defoaming agent, preferably a silicone oil defoaming agent, such as BYK-080 from BYK Chemie.

The rheological control agent may be an organo clay, silica and castor oil derivative, preferably an organo clays, such as Viscogel B7 from Chimica Mineraria SpA.

The conductive coating may be commercially available products with a melamine resin binder, such as the XZ302 screen printing dye from Wiederhold Siebdruckfarben of Germany. This dye is based on carbon black and graphite and a thermosetting resin of the melamine resin type, the solvent mixture comprising 2-(2-butoxyethoxy) ethanol, 2-butoxyethanol, butan-1-ol and 1-methoxypropan-2-ol. The retarder UV4 from Wiederhold Siebdruckfarben may be used for optimisation of viscosity and drying time.

In a preferred embodiment of the invention the melamine resin-based conductive coating is used in double layer capacitors of electrolytes based on tetraalkyl-ammonium salts. Thus, it has been found, that those double layer capacitors based on tetraalkylammonium salts have a high capacitance and a higher power capability than double layer capacitors using electrolyte compositions of other salts like lithium and sodium salts. Although not fully understood, the formation of any interface layer appears highly dependent on the ionic species of the electrolyte, as well as on the surface structure and chemical composition of the electrode carbon. The excellent performance of double layer capacitors based on tetraalkylammonium salts is ascribed to little, thin, stable and dense interface layers being formed at the electrode-electrolyte interfaces of such capacitors, allowing a narrow charge separation and a high capacitance. In contrast, in the case of lithium salts, thicker, unstable and less dense interface layers are formed, which provide less capacitance. Accordingly, the concept of conductive coatings based of melamine resin binder is particularly advantageous in those cases, where the electrolyte salt is a tetraalkylammonium salt. Thus, the higher capacitance of capacitors of such salts is most effectively applied when combined when the low impedance and low internal loss of the conductive coatings of the present invention.

Although a high number of tetraalkylammonium salt may be used, the above advantage is especially pronounced for tetramethylammonium tetrafluoroborate, tetraethylammonium tetrafluoroborate, tetrabutylammonium tetrafluoroborate, tetramethylammoniumhexafluorophosphate, tetraethylammonium hexafluorophosphate and tetrabutylammonium hexafluorophosphate, in particular tetraethylammonium tetrafluoroborate. The electrolyte solvent may be any nonaqeuous solvent selected from the groups of carbonates, lactones and nitriles. Preferably the electrolyte solvent is selected from the group of ethylene carbonate, propylene carbonate, dimethyl carbonate, diethyl carbonate, ethyl methyl carbonate, γ-butyrolactone, γ-valerolactone and acetonitrile and mixtures thereof. More preferably the electrolyte solvent is γ-butyrolactone.

In a preferred embodiment of the invention the electrolyte is confined in a separator, consisting of a porous structure made from a polymer, preferably polyethylene or polypropylene.

In a preferred embodiment of the invention the current collector is a metal current collector, preferably of nickel, copper or aluminium, more preferably of aluminium.

The electrode structures of the double layer capacitors of the present invention comprises carbon, binder, solvent and optionally graphites and any auxiliary compounds In a preferred embodiment of the invention the carbons of the electrode structure are high surface active carbons.

In a preferred embodiment of the invention the binder of the electrode structure is selected from the group consisting of melamine resins, polyvinyl butyrals and fluorocontaining polymers, preferably PVdF and PVdF-copolymers, including PVdF-hexafluoro propylene copolymers. For the processing of such binders, solvents therefor are preferably selected from the group consisting of glycol ethers and glycol ether esters, dimethyl formamid, dimethyl acetamid and N-methyl-pyrrolidone.

The invention further relates to a simple, low-cost method of preparing double layer capacitors.

According to the invention the conductive coating is prepared from a paste comprising carbon black, graphite, melamine resin binder, solvent and optionally any auxiliary compounds. Carbon blacks and graphites materials are added along with any dispersing agents and defoaming agent and a polymerisation reaction partner are mixed in alcohols, glycols or glycol ethers. The melamine resin is added along with any rheological control agent to produce a uniform paste, which is coated or printed onto the current collector and heated to 100–150° C. for 10–30 min.

Electrode pastes are prepared similar to the above conductive paste from active carbon, binder, solvent and optionally graphite and any auxiliary compounds, and coated or printed onto the conductive coating.

The coating or printing technique applied is preferably a screen printing, gravure printing or a slot die coating technique.

Double layer capacitors are formed by sandwiching between two of the above conductive coating-electrode laminates a porous separator. The capacitor laminate is subsequently confined in a polymer coated metal pouch and impregnated with the electrolyte solution. Eventually, the pouch is sealed.

A final aspect of the invention relates to the use of double layer capacitors according to the present invention in a hybrid combination with batteries, in which combination the double layer capacitor provides peak current, whereas the battery provides the base load currents. In such applications the battery capacity utilisation is improved, as the stress on the battery is reduced.

The invention is illustrated by the following non-limiting examples.

EXAMPLES

CONDUCTIVE COATING PASTE PREPARATION:

EXAMPLE 1

A mill base was prepared from 100 g of carbon black (Shawinigan Black 100% compressed from Chevron), 50 g of graphite (Lonza KS15 from TIMCAL) and 2 g of dispersing agent (Disperbyk 170 from BYK Chemie), which was added to 100 g of butoxy-ethanol and 100 g of 1-methoxy-propan-2-ol and milled in a pearlmill for 30 min. 70 g of alkyd resin reaction partner (Alftalat AC317 from Hoechst) was added and the mill base was mixed for further 30 min.

Under stirring, 30 g of methylated melamine formaldehyde (Marprenal MF 927 from Hoechst) and 3 g of theological control agent (Viscogel B7 from Chimica Mineraria SpA) were added to the mill base to form the final conductive coating paste.

EXAMPLE 2

500 g of XZ302 screen printing dye from Wiederhold Siebdruckfarben of Germany is mixed with 150 g of UV4 from Wiederhold Siebdruckfarben of Germany.

CONDUCTIVE COATING PREPARATION

EXAMPLE 3

The conductive coating paste of example 1 was coated onto a 20 μm aluminium current collector by screen printing. Subsequently, the coating was cured at 110° C. for 30 min. The coated layer had a thickness of 5 μm.

EXAMPLE 4

The conductive coating paste of example 2 was coated onto a 20 μm aluminium current collector by screen printing. Subsequently, the coating was cured at 120° C. for 30 min. The coated layer had a thickness of 5 μm.

ELECTRODE PASTE PREPARATION

EXAMPLE 5

192 g of polyvinyl butyral from Hoechst was dissolved in 3653 g of Dowanol PMA (propylene glycol methyl ether acetate) from Dow Chemicals in a high speed mixer. 1170 g of active carbon CECA 4S from CECA of France is added to the solution to form a pre-mixed paste. The pre-mixed paste was milled in a pearlmill for 60 min. to form the final paste.

ELECTRODE COATING

EXAMPLE 6

The electrode paste of example 5 was applied onto the conductive layer coated current collector of example 3 by screen printing. The electrode layer had a thickness of 15 μm.

EXAMPLE 7

The electrode paste of example 5 was applied onto the conductive layer coated current collector of example 4 by screen printing. The electrode layer had a thickness of 15 μm.

DOUBLE LAYER CAPACITOR PREPARATION

EXAMPLE 8

The conductive coating-electrode laminates of example 6 were used for the preparation of a double layer capacitor with an active area of 46 mm×111 mm. The double layer capacitor laminate was produced by sandwiching between two of the above conductive coating-electrode laminates a 20 μm porous polyethylene separator. The capacitor laminate was confined in a polymer coated aluminum pouch. The double layer capacitor laminate was impregnated with 1 ml of an electrolyte solution prepared by dissolving 50 g of tetraethylammonium tetrafluoroborate in 200 ml of γ-butyrolactone, and the pouch was sealed.

The double layer capacitor was charged at a constant potential of 2.5 V for 72 hours at room temperature. The impedance was measured in the range 20 kHz–1Hz using a Solartron 1250 Frequency Response Analyser and a Solartron 1286 Electrochemical Interface. The impedance and capacitance were determined from the real and imaginary impedances at 200 Hz. The impedance was 38 mΩ and the capacitance was 188 mF, respectively. Following 1680 hours of operation at elevated temperature, 70° C., the capacitance was unchanged, however, the impedance was increased by a factor of 4.2 to 160 mΩ. Assuming an activation energy of 50–60 kJ/mole for any degradation process occuring, the 1680 hours operation at 70° C. corresponds to several years of ambient temperature lifetime, indicating the long tem stability.

EXAMPLE 9

A double layer capacitor of an active area of 46 mm×111 mm was prepared and tested similar to example 8, however, using the conductive coating-electrode laminate of example 7.

The impedance was 30 mΩ and the capacitance was 199 mF, respectively. Following 1680 hours of operation at 70° C., the impedance was increased by a factor of 3.8 to 114 mΩ. The capacitance was unchanged.

COMPARATIVE EXAMPLE

A double layer capacitor essentially similar to the double layer capacitor described in the above example 8 was prepared, however, substituting a conductive coating prepared from a mixture of 4,000 gr. Shawiningan Black 100% compressed from Chevron, 5,72 g of polyacrylic acid from Aldrich and 12,28 g of water for the melamine resin binder of example 1.

The impedance was 300 mΩ and the capacitance was 100 mF, respectively. Following 200 hours of operation at 70° C., the impedance was increased by a factor of 4 to 1.2 Ω, rendering the capacitor impedance unacceptably high for high power applications.

EXAMPLE 10

A 5 V double layer capacitor was produced from a series connection of two capacitors of example 8.

Upon pulsed discharge (0.6 ms @ 1.5 A+4.4 ms @ 0.3 A, continuously repeated) of a 400 mAh (1C) lithuium-ion battery (graphite/lithium manganese oxide spinel) to a cutoff voltage of 2.5 V, a battery capacity utilisation of 224 mAh was obtained.

Applying the same discharge profile to the same battery, however, parallelly combined with the 5 V double layer capacitor, an extended capacity utilisation of 315 mAh was reached.

What is claimed is:

1. A double layer capacitor which comprises a conductive coating comprising a melamine resin binder, at the interfaces between current collectors and electrodes, the conductive coating is provided from a mixture composed essentially of:

5–50% by weight of carbon blacks;

5–20% by weight of graphite;

5–40% by weight of a melamine resin binder and polymerisation reaction partner;

25–85% by weight of solvent; and

0–10% by weight of auxiliary materials selected from the group consisting of dispersing agents, defoaming agents and rheological control agents.

2. A double layer capacitor according to claim 1, in which the carbon black of the conductive coating is selected from the group consisting of furnace blacks, acetylene blacks and lampblacks.

3. A double layer capacitor according to claim 1, wherein the graphite of the conductive coating has a particle size in the range of 0.5–20 μm.

4. A double layer capacitor according to claim 1, in which the polymerisation reaction partner is an alkyd resin.

5. A double layer capacitor according to claim 1, in which the solvent of the conductive coating mixture is selected from the group of alcohols $R^1$—OH, wherein $R^1$ represents $C_1$–$C_4$ alkyl, and glycols and glycol ethers $R^2$—$(OCHR^3CH_2)_n$—OH, n=1–3, wherein $R^2$ represents hydrogen or $C_1$–$C_4$ alkyl and wherein $R^3$ represents hydrogen or methyl.

6. A double layer capacitor according to claim 1, in which the auxiliary materials of the conductive coating mixture are selected from the group of non-ionic, anionic, cationic or amphoteric dispersing agents, preferably anionic dispersing agents, mineral oil or silicone oil defoaming agents, preferably silicone oil defoaming agents, organo clay, silica or castor oil derivative rheological control agents, preferably organo clay rheological control agents, or any mixture thereof.

7. A double layer capacitor which comprises a conductive coating comprising a melamine resin binder, at the interfaces between current collectors and electrodes and wherein the conductive coating comprises the XZ302 screen printing dye.

8. A method for the fabrication of a double layer capacitor comprising the steps of:

mixing carbon blacks and graphites in an alcohol, a glycol or glycol either with a polymerization reaction partner, a dispersing agent and defoaming agent to produce a mill base;

adding melamine resin and a rheological control agent to obtain a uniform conductive coating paste;

applying conductive coating paste onto a current collector by coating or printing to produce a conductive coating;

curing said conductive coating by heating to 100–150° C. for 10–30 minutes;

preparing an electrode paste as described above from active carbon, binder, solvent and optionally graphite and auxiliary materials;

applying said electrode paste onto the conductive coating by coating or printing to produce a conductive coating-electrode laminate;

sandwiching between two conductive coating-electrode laminates a porous separator to form a capacitor laminate;

confining said capacitor laminate in a polymer coated metal pouch;

preparing the electrolyte solution by dissolving the electrolyte salt in the electrolyte solvent;

impregnating the capacitor laminate with the electrolyte solution;

sealing the pouch.

9. A method for the fabrication of a double layer capacitor according to claim 8, in which the coating or printing technique is a screen printing, gravure printing or a slot die coating technique.

10. A double layer capacitor, which comprises an ion-conducting phase, at least one electrode and at least one current collector having an interface with said at least one electrode, and a conductive coating comprising a melamine resin binder provided at said interface between said current collector and said at least electrode.

11. A double layer capacitor according to claim 10, wherein said melamine resin is an alkylated melamine formaldehyde resin.

12. A double layer capacitor according to claim 11, in which said melamine resin is a methylated melamine formaldehyde resin.

13. A double layer capacitor according to claim 10, wherein said conductive coating is provided from a mixture composed essentially of 5–50% by weight of carbon black;

5–20% by weight of graphite;

5–40% by weight of melamine resin binder and polymerization reaction partner;

25–85% by weight of solvent; and

0–10% by weight of auxiliary materials.

14. A double layer capacitor according to claim 13 wherein said auxiliary materials are selected from the group consisting of dispersing agents, defoaming agents and rheological control agents.

15. A double layer capacitor according to claim 14, wherein said conductive coating is provided from a mixture composed essentially of 10–40% by weight of carbon black;

5–15% by weight of graphite;

10–30% by weight of melamine resin binder and polymerization reaction partner;

30–74% by weight of solvent; and

1–5% by weight of auxiliary materials.

16. A double layer capacitor according to claim 14, wherein said conductive coating is provided from a mixture composed essentially of 20–25% by weight of carbon black;

10–15% by weight of graphite;

15–25% by weight of melamine resin binder and polymerization reaction partner;

35–53% by weight of solvent; and

2–5% by weight of auxiliary materials.

17. A double layer capacitor according to claim 13, wherein said carbon black is selected from the group consisting of furnace blacks, acetylene blacks and lampblacks.

18. A double layer capacitor according to claim 13, wherein said graphite has a particle size in the range of 0.5-20 $\mu$m.

19. A double layer capacitor according to claim 13, wherein said graphite has a particle size in the range of 0.5-10 $\mu$m.

20. A double layer capacitor according to claim 13, in which said polymerization reaction partner is an alkyd resin.

21. A double layer capacitor according to claim 13, wherein said solvent is selected from the group consisting of alcohols for formula $R^1$—OH, wherein $R^1$ represents $C_1$–$C_4$ alkyl, and glycols and glycol ethers of formula $R^2$—$(OCHR^3CH_2)_n$—OH, wherein n=1–3, $R^2$ represents hydrogen or $C_1$–$C_4$ alkyl and $R^3$ represents hydrogen or methyl.

22. A double layer capacitor according to claim 13, wherein said auxiliary material is one or more materials selected from the group consisting of non-ionic, anionic, cationic and amphoteric dispersing agents, mineral oil and silicone oil defoaming agents, organo clay, silica and castor oil derivative rheological control agents.

23. A double layer capacitor according to claim 22, wherein said auxiliary material is one or more materials selected from the group consisting of anionic dispersing agents, silicone oil defoaming agents and organo clay rheological control agents.

24. A double layer capacitor according to claim 11, wherein said conductive coating is a screen printing dye which includes a melamine resin binder.

25. A double layer capacitor according to claim 11, wherein said ion conducting phase includes an electrolyte salt which is one or more tetraalkylammonium salts.

26. A double layer capacitor according to claim 25, wherein said one or more tetraalkylammonium salts is selected from the group consisting of tetramethylammonium tetrafluoroborate, tetraethylammonium tetrafluoroborate, tetrabutylammonium tetrafluoroborate, tetramethylammoniumtetrafluoroborate, tetrabutylammonium tetrafluoroborate, tetramethylammonium hexafluorophosphate, tetraethylammonium hexafluorophosphate and tetrabutylammonium hexafluorophosphate.

27. A double layer capacitor according to claim 26 wherein said tetraalkylammonium salt is tetraethylammonium tetrafluoroborate.

28. A double layer capacitor according to claim 11 wherein said ion conducting phase includes a solvent selected from the group consisting of carbonates, lactones and nitriles.

29. A double layer capacitor according to claim 28, wherein said solvent is selected from the group consisting of ethylene carbonate, propylene carbonate, dimethyl carbonate, diethyl carbonate, ethyl methyl carbonate, γ-butyrolactone, γ-valerolactone, acetonitrile and mixtures thereof.

30. A double layer capacitor according to claim 29, wherein said solvent is γ-butyrolaconte.

31. A double layer capacitor according to claim 11, wherein said current collector is a metal current collector.

32. A double layer capacitor according to claim 31 wherein said metal is selected from the group consisting of nickel, copper and aluminum.

33. A double layer capacitor according to claim 32 wherein said metal is aluminum.

34. A method of making a double layer capacitor as claimed in claim 20, which comprises the steps of:

(i) mixing carbon black and graphite in an alcohol, a glycol or glycol ether with polymerization reaction partner, a dispersing agent and a defoaming agent to produce a mill base;

(ii) adding melamine resin and a rheological control agent to obtain a uniform conductive coating paste;

(iii) applying said conductive coating paste onto a current collector by coating or printing to produce a conductive coating;

(iv) curing said conductive coating by heating to 100–150° C. for 10–30 minutes;

(v) preparing an electrode paste from active carbon, binder, solvent and optionally graphite and auxiliary materials in a manner analogous to steps (i) to (iv) above;

(vi) applying said electrode paste onto said conductive coating by coating or printing to produce a conductive coating-electrode laminate;

(vii) sandwiching a porous separator between two conductive coating-electrode laminates to form a capacitor laminate;

(viii) confining said capacitor laminate in a polymer coated metal pouch;

(ix) preparing an electrolyte solution by dissolving electrolyte salt in electrolyte solvent;

(x) impregnating said capacitor laminate with the electrolyte solution; and (xi) sealing said pouch.

35. A method according to claim 34, in which said coating or printing technique is selected from the group consisting of screen printing, gravure printing and slot die coating techniques.

36. A double layer capacitor comprising at least one carbon electrode structure with a polymer binder, a non-aqueous electrolyte and at least one metal foil current collector having an interface with said at least one carbon electrode structure, and a conductive coating comprising a melamine resin binder provided at said interface between said at least one current collector and said at least one electrode structure.

37. A double layer capacitor according to claim 36, wherein said melamine resin is an alkylated melamine formaldehyde resin.

38. A double layer capacitor according to claim 37, wherein said melamine resin is a methylated melamine formaldehyde resin.

39. A double layer capacitor according to claim 36, wherein said conductive coating is provided from a mixture composed essentially of:

5–50% by weight of carbon black;

5–20% by weight of graphite;

5–40% by weight of melamine resin binder and polymerization reaction partner;

25–85% by weight of solvent; and

0–10% by weight of auxiliary materials.

40. A double layer capacitor according to claim 39 wherein said auxiliary materials are selected from the group consisting of dispersing agents, defoaming agents and rheological control agents.

41. A double layer capacitor according to claim 40 wherein said conductive coating is provided from a mixture composed essentially of:

10–40% by weight of carbon black;

5–15% by weight of graphite;

10–30% by weight of melamine resin binder and polmerization reaction partner;

30–74% by weight of solvent; and

1–5% by weight of auxiliary materials.

42. A double layer capacitor according to claim 40, wherein said conductive coating is provided from a mixture composed essentially of:

20–25% by weight of carbon black;

10–15% by weight of graphite;

15–25% by weight of melamine resin binder and polymerization reaction partner;

35–53% by weight of solvent; and

2–5% by weight of auxiliary materials.

43. A double layer capacitor according to claim 39, wherein said carbon black is selected from the group consisting of furnace blacks, acetylene blacks and lampblacks.

44. A double layer capacitor according to claim 39, wherein said graphite has a particle size in the range of 0.5–20 $\mu$m.

45. A double layer capacitor according to claim 39, wherein said graphite has a particle size in the range of 0.5–10 $\mu$m.

46. A double layer capacitor according to claim 39, wherein said polymerization reaction partner is an alkyd resin.

47. A double layer capacitor according to claim 39, wherein said solvent is selected from the group consisting of alcohols of formula $R^1$—OH, wherein $R^1$ represents $C_1$–$C_4$ alkyl, and glycols and glycol ethers of formula $R^2$—$(OCHR^3CH_2)_n$—OH, wherein n=1–3, $R^2$ represents hydrogen or $C_1$–$C_4$ alkyl and $R^3$ represents hydrogen or methyl.

48. A double layer capacitor according to claim 39, wherein said auxiliary material is one or more materials selected from the group consisting of non-ionic, anionic, cationic and amphoteric dispersing agents, mineral oil and silicone oil defoaming agents, organo clay, silica and castor oil derivative rheological control agents.

49. A double layer capacitor according to claim 48, wherein said auxiliary material is one or more materials selected from the group consisting of anionic dispersing agents, silicone oil defoaming agents and organo clay rheological control agents.

50. A double layer capacitor according to claim 36, wherein said conductive coating is a screen printing dye which includes a melamine resin binder.

51. A double layer capacitor according to claim 36, wherein said ion conducting phase includes an electrolyte salt which is one or more tetraalkylammonium salts.

52. A double layer capacitor according to claim 51, wherein said one or more tetraalkylammonium salts is selected from the group consisting of tetramethylammonium tetrafluoroborate, tetraethylammonium tetrafluoroborate, tetrabutylammonium tetrafluoroborate, tetramethylammoniumtetrafluoroborate, tetrabutylammonium tetrafluoroborate, tetramethylammonium hexafluorophosphate, tetraethylammonium hexafluorophosphate and tetrabutylammonium hexafluorophosphate.

53. A double layer capacitor according to claim 52 wherein said tetraalkylammonium salt is tetraethylammonium tetrafluoroborate.

54. A double layer capacitor according to claim 36 wherein said ion conducting phase includes a solvent selected from the group consisting of carbonates, lactones and nitriles.

55. A double layer capacitor according to claim 54, wherein said solvent is selected from the group consisting of ethylene carbonate, propylene carbonate, dimethyl carbonate, diethyl carbonate, ethyl methyl carbonate, γ-butyrolactone, γ-valerolactone, acetonitrile and mixtures thereof.

56. A double layer capacitor according to claim 55, wherein said solvent is γ-butyrolactone.

57. A double layer capacitor according to claim 36, wherein said current collector is a metal current collector.

58. A double layer capacitor according to claim 57 wherein said metal is selected from the group consisting of nickel, copper and aluminum.

59. A double layer capacitor according to claim 58 wherein said metal is aluminum.

60. A hybrid combination comprising a double layer capacitor according to claim 11 operatively combined with a battery.

61. A hybrid combination according to claim 60 wherein said double layer capacitor and said battery are in parallel combination.

62. A hybrid combination comprising a double layer capacitor according to claim 36 operatively combined with a battery.

63. A hybrid combination according to claim 62 wherein said double layer capacitor and said battery are in parallel combination.

* * * * *